May 13, 1947.  R. A. BECKWITH  2,420,294
DRIVE GEAR MECHANISM
Filed April 28, 1944  2 Sheets-Sheet 1
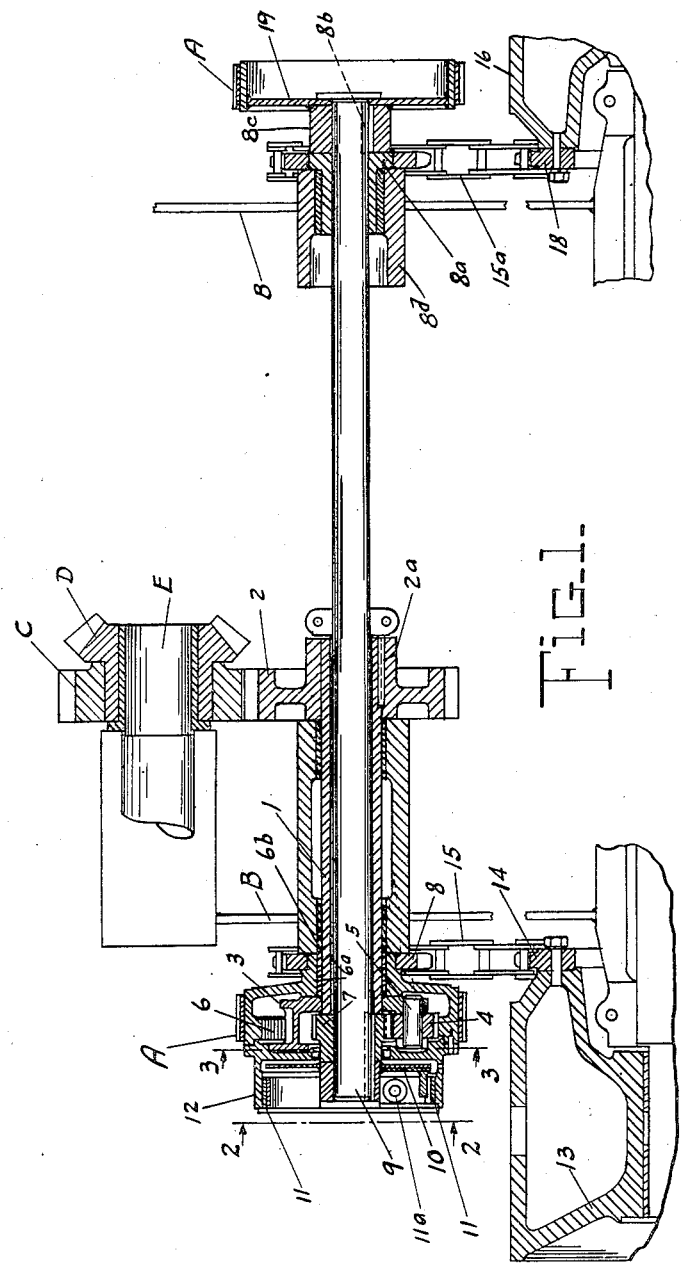
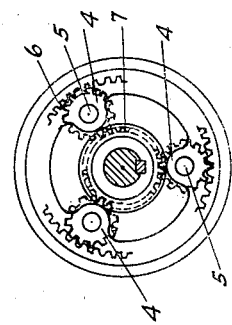
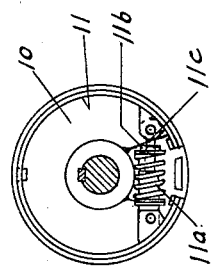
Inventor
Raymond A. Beckwith
By Robert Cobb
Attorneys May 13, 1947. R. A. BECKWITH 2,420,294
DRIVE GEAR MECHANISM
Filed April 28, 1944 2 Sheets-Sheet 2

Inventor
Raymond A. Beckwith
By Robert Pobb
Attorneys

Patented May 13, 1947

2,420,294

UNITED STATES PATENT OFFICE 2,420,294

DRIVE GEAR MECHANISM

Raymond A. Beckwith, Milwaukee, Wis., assignor to Koehring Company, Milwaukee, Wis., a corporation Application April 28, 1944, Serial No. 533,217

5 Claims. (Cl. 74—315)

This invention pertains primarily and directly to the art of traction drive gearing or mechanism for vehicles or the like, in which are employed customarily traction driving members or wheels which may be otherwise characterized as power utilizing driving members. In the ordinary types of traction drive mechanism as used today, the traction wheels are commonly connected by means of differential drive gearing by which the driving forces are transmitted to the separate wheels. Differential gearing is necessarily employed in order that one wheel may turn faster than the other wheel in taking turns of the vehicle as it proceeds or travels forwardly or rearwardly. As is well known in the standard conventional differential drive gearing for complemental traction wheels of a vehicle, if one wheel is not resisted as when it is off the ground or operates sliding on ice or slippery pavement, there will be obtained no ground traction for the other wheel. The latter will merely spin and tractive effort on the part of the vehicle is discontinued.

An especial object of the present invention, therefore, has been to improve upon drive mechanisms of the type above referred to by the provision of hollow planetary differential drive gearing associated with a special novel type of resistance unit working together therewith, in such a manner that in the operation of the traction members or power utilizing members, as they may be called, if one of these members is off the ground or not giving traction resistance, the drive gearing will operate the other of the members with substantially the full driving force delivered from the primary drive gearing or prime mover, which will be the engine or motor driving the general drive gear mechanism. In other words, stated generally, the operation of the mechanism of the invention is such that in the event one of the power utilizing members, a traction member, for instance, has its resistance effort reduced or entirely eliminated as when the traction wheel slides freely on ice, the operation of the mechanism will be such as to be caused to be delivered to the other traction member the driving effort which would have been previously directed to the first traction member if it remained upon the ground.

More fully describing the above peculiar action of the present improved drive mechanism, it may be stated that the mechanism is so constructed that power from the prime mover will be delivered generally equally to the respective complemental driving members, or traction members in this particular instance, when the traction members are both upon the ground. However, when the demand or requirement of power of one of the traction members is reduced as by reduction of the resistance forces acting thereon, the delivery of power to the other of the traction members will be proportionately increased. Under these conditions, therefore, one of the traction members, or power utilizing members as they may be called, is always supplied with the power for effecting its driving action, notwithstanding that the other member may be turned without tractive force delivered thereto.

In the carrying out of the invention it is proposed to employ in conjunction with planetary differential drive mechanism a novel form of resistance unit which, working in conjunction with the planetary gearing, and affording a certain amount of slippage of parts, will enable the differential effect of ordinary differential gearing to be obtained and which in addition will automatically effect the delivery of increased power to an active power utilizing member or traction wheel when the other of complemental such members is not absorbing such power.

With the above stated and other objects in view a full understanding of the construction of my driving mechanism and the operation thereof will be had upon reference to the following detailed description in conjunction with the accompany drawing, in which Figure 1 is a generally diagrammatic view illustrating however the drive gearing of the invention in section, very largely, and the general arrangement of the same in regard to the power utilizing members which in this instance are traction wheels.

Figure 2 is a view taken about on the line 2—2 of Figure 1, looking in the direction of the arrows, the cover plate for the friction drum removed.

Figure 3 is a sectional view taken about on the line 3—3 of Figure 1.

Figure 4:
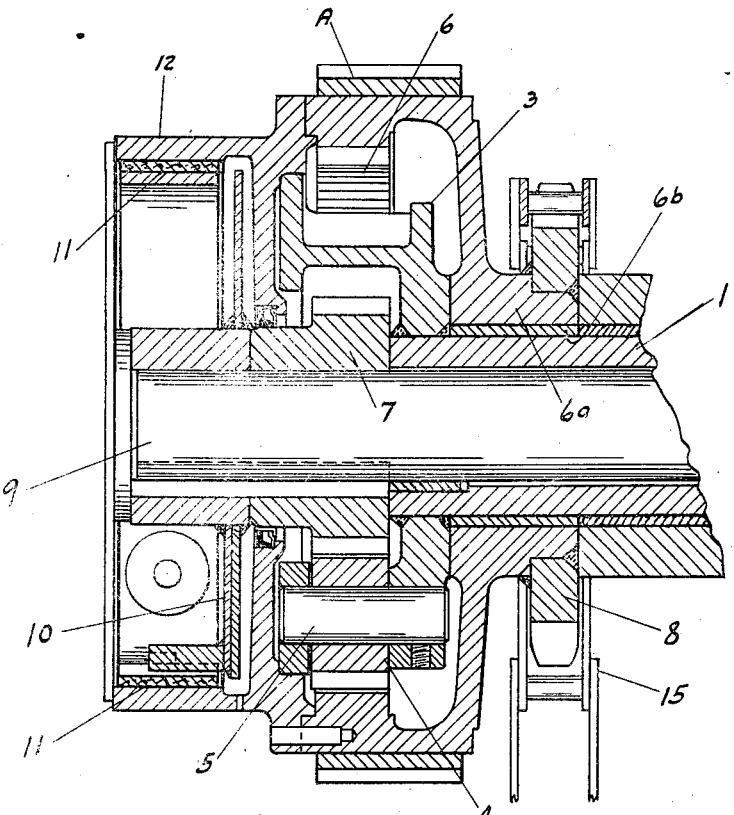
Figure 4 is an enlarged sectional view of the planetary gear and friction unit features shown in smaller illustration in Figure 1.

Referring directly to the drawings and particularly Figure 1, my invention is illustrated in conjunction with a vehicle structure which is somewhat fragmentarily shown as including brake members A and certain frame parts B. The frame of the vehicle will support any suitable type of motor from which power is delivered to a driving gear C supported with a bevel gear D on a suitable shaft E journaled in the frame superstructure in any suitable manner. The driving gear C operates a hollow differential shaft 1 through the provision of the spur gear 2 meshing with gear C and keyed as at 2a to said shaft 1. Keyed or welded to the shaft 1 is the planet gear carrier 3 which supports the planet gears 4 mounted on the planet gear shafts 5, see Figures 1 and 3. The planet gears 5 mesh, as customary, in gearing of this type, with the internal gear 6 provided with the hub portion 6a which is rotative with suitable bearing 6b surrounding the shaft 1. At the outer end of the shaft 1 is the sun gear 7. Welded to, or otherwise secured to rotate with the hub portion 6a of the internal gear 6, is a sprocket 8; and this sprocket 8 is connected by a sprocket chain 15 with a sprocket 14 attached to one of the traction wheels 13 for transmission of driving forces to the last member as later to be pointed out.

The sun gear 7 is keyed to a solid shaft 9 which extends transversely across the machine or vehicle frame and on this shaft 9, secured by the same key as secures the sun gear is keyed the hub portion of a spider 10, see Figure 2. This spider 10 carries a substantially circular friction shoe or band member 11. As seen in Figure 2, the ends of the shoe 11 are adapted to be spread by means of a spring 11a adjustable by means of a nut 11b on a rod 11c connecting the spring ends by means of the nut 11b. The friction action of the shoe 11 in relation to the surrounding friction drum 12 may be loaded as required for the purposes of the invention, the parts 10, 11, and 12 constituting a friction unit operated in conjunction with the planetary gearing described in a manner more fully hereinafter.

The drum 12 of the friction unit is welded or otherwise rigidly connected to the internal gear 6. The shaft 9 at the end opposite that which is equipped with the friction unit has mounted thereon the sprocket 8a keyed to the shaft 9 as shown at 8b and connected by a sprocket chain 15a with the sprocket 18 attached to the wheel 16 at the right side of the machine.

The brake drum 19 for the right hand brake A is fixed to the corresponding end of the shaft 9 by means of hub 8c of sprocket 8a keyed at 8b as above stated. Brake drum 19 is welded to the hub 8c and said hub in turn is welded to the sprocket 8a. The sprocket 8a is supported by a bushing in a sleeve section 8d integral with the right frame member B. The brake band of the left hand brake A works on the outer surface of gear 6, the same acting as a drum.

The foregoing generally describes the construction of the various parts of the mechanism involved in the invention.

While the power utilizing or driven members 13 and 16 are shown herein as traction members of a vehicle it is within the contemplation of the invention that they may be power absorbing members of different types designed for other than vehicular purposes.

The operation of the invention as used in conjunction with a traction vehicle will now be set forth.

First it will be assumed that both the wheels 13 and 16 are in engagement with the ground or earth surface over which the vehicle is traveling. The flow of power from the prime mover to the gears C and 2 and thence to the wheels, will be in the following manner, both wheels being driven with substantially equal driving forces and therefore substantially equal tractive effort. Under the conditions stated, the differential shaft is driven by the spur gear 2 and in turn drives the planet gear carrier 3 and the planet gears 4. Since the gears 4 are in mesh with the internal gear 6 and the sun gear 7 by reason of the cooperation of the friction unit, the driving force is communicated to the wheel 13 by way of the internal gear 6, its attached sprocket 8 and the chain 15 connected with said wheel 13. At the same time the driving force is transmitted to substantially the same extent as above described from the planet gears 4 to the sun gear 7, the key connecting the sun gear to the shaft 9, thereby to the shaft 9 for rotation of the latter for driving the wheel 16 from the sprocket 8a to the sprocket 18 by the sprocket chain 15a.

Figures 5, 6:
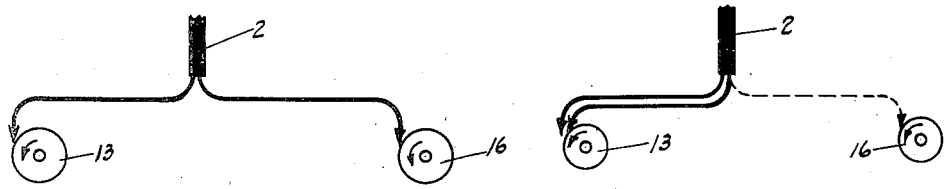
Figure 5 is a diagrammatic view of the flow of power from the prime mover to the traction wheels when both of the latter are upon the ground.
Figure 6 is a view similar to Figure 5 but illustrating the manner of flow of the power to the wheels when the right wheel is off the ground.

The foregoing operation or method of transmitting the driving force substantially equally to the two traction wheels or power driven members 13 and 16 is diagrammatically illustrated in Figure 5 of the drawings. Under the conditions stated the wheels 13 and 16 will be turned in the same direction while engaging the ground.

Secondly, the operation of the traction members 13 and 16 will be described on the assumption that the right wheel 16 is off the ground or is turning on ice or the like with no tractive effort. Under this condition the driving force is transmitted from the differential shaft 1 to the pinion carrier 3, pinion shafts 5, pinions 4, in one direction to the internal gear 6, its affixed sprocket 8, chain 15, gear 14, to the wheel 13. At the same time driving force is also transmitted from the pinions 4 to the sun gear 7, the key connecting the sun gear to the shaft 9, the spider 10 of the friction unit, the shoe 11, and the drum 12 of said unit, and thence to the gear 6 fixed to the drum 12 and to the wheel 13 via the sprocket 8, chain 15, and sprocket 14 previously mentioned as more directly actuated.

This condition is roughly illustrated by the diagrammatic view of Figure 6, from which it may be observed that by reason of the operation of the mechanism as just set forth, the decrease in the resistance or power requirements of the right wheel 16, which is off the ground, results in the transfer of the un-needed driving force for the wheel 16 to increase the driving force effective on the wheel 13. Therefore, even though the wheel 16 is off the ground, the positive driving force transmitted from the prime mover by the gears C and 2 to the differential shaft 1 is virtually completely availed of for producing the tractive effort of the wheel 13. During the above operation the turning of the shaft 9 will result in turning of the wheel 16 even though the latter is off the ground.

The third condition to be described is the sequence of transmission of the driving force of the prime mover to the wheel 16 when the wheel 13 is off the ground. Under this condition of operation, the hollow differential shaft 1 being driven from the gear 2 drives the planet gear carrier 3, the planet gear shafts 5, and the planet gears 4, so that the driving force is carried from the latter through the sun gear 7 keyed to the shaft 9, to said shaft 9, and therefore more directly to the sprocket 8a driving the wheel 16 by its connecting sprocket chain 15a and the sprocket 18 of said wheel 16. Additionally, since the wheel 13 is off the ground and does not require or absorb any substantial amount of driving force other than sufficient to cause it to turn freely, the driving force is transmitted to wheel 16 from the pinions 4 to the internal gear 6, the drum 12 affixed to the internal gear, the friction shoe 11, the spider 10 keyed to the shaft 9, to the shaft 9, and thence to the wheel 16 supplementing the previously mentioned substantially equal driving force directly operating said shaft.

From the foregoing, therefore, it is to be understood that as the power requirements of either one of the power utilizing members, or traction wheels, 13 and 16, decrease, that portion of the driving force that would otherwise be required by such one traction wheel or member will be automatically transferred or transmitted to the other of such wheels so that substantially the whole driving force will be carried to the latter with an increased effect largely in proportion to the decrease in the effective power requirements of the first mentioned member or wheel.

Under normal conditions as indicated before the power is delivered from the prime mover substantially equally to the two traction members 13 and 16, ignoring certain elements of friction loading incident to specific construction of the parts in the lines of transmission of the force, when the two wheels 13 and 16 are on the ground at one time their power requirements for tractive effort are substantially equal.

Now it should be noted that the mechanism of my invention has been designed necessarily with a view to obtaining the effect of an ordinary differential gearing as may be needed incident to the rotation of one of the power utilizing members 13 or 16 at a speed greater than the other, as when the vehicle is turning. This is the common requirement in vehicle constructions for which the ordinary known differential gearing is employed. In the present instance with my mechanism, the differential movements of the two traction members 13 and 16 is accommodated for by slippage of the shoe 11 in relation to the drum 12, or the slippage of the drum 12 in relation to the shoe 11, as the case may be.

It will be apparent from a study of the combination planetary gearing and friction unit operation as above outlined, that from a broad aspect my invention involves the method of delivering power from a suitable source to a plurality of complemental power utilizing instrumentalities (for instance traction wheels) in such a manner that under certain conditions the power is distributed substantially equally to the power utilizing members; and when the demand or requirement for the driving power of one of these members decreases, the power then unused by said member is employed to supplement that delivered to the other member. Therefore, substantially all of the power is utilized by distribution between the two members for positive driving action thereof, or transmitted to either one of the said members with substantially full effect when the other member does not require or use the power normally delivered to it.

Figure 7:
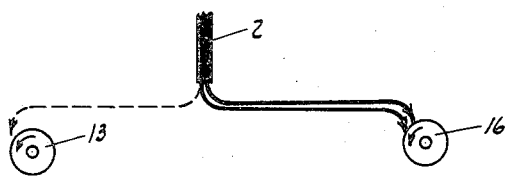
Figure 7 is a view similar to Figure 5 but illustrating the reverse of Figure 6 in that the left wheel is off the ground.

The foregoing is exemplified particularly by the diagrammatic view of Figures 5, 6 and 7. Figure 5 illustrating the full power being delivered to the two power utilizing members or wheels 13 and 16; Figure 6 illustrating that the wheel 16 is not utilizing the power that normally is delivered to it under the conditions of Figure 5; the dotted line representing that just sufficient power is passing to the wheel 16 to turn it, whereas substantially the full power normally delivered to the wheel 16 is being delivered to the wheel 13 supplemental to the approximately half portion of the driving force normally delivered to it. In Figure 7 the conditions assumed are the reverse to that illustrated in Figure 6.

The general movement of the vehicle equipped with my driving mechanism may be controlled by the brakes A working on members 6 and 19. The brake bands of said brakes are simultaneously applied and released, when operated, and do not interfere with the operation of the drive mechanism as previously described.

Having thus described my invention, what I claim as new and desire to secure by Letters Patent of the United States, is:

1. In drive mechanism, in combination, a drive member, a driven shaft, first and second traction members, operating mechanism for said shaft comprising a differential shaft connected to and driven by the drive member, a planetary gear unit comprising an internal gear drivingly connected to one of said traction members, a sun gear connected to the driven shaft and planet gears, means connecting said driven shaft to the other tractor member, and a friction unit including normally engaged but relatively movable parts one of which is connected to the said internal gear and the other of which is connected to said driven shaft.

2. Mechanism as claimed in claim 1, in which the friction unit includes means normally holding the parts thereof immovably engaged during simultaneous and equal movemet of the traction members.

3. Mechanism as claimed in claim 2, in which the friction unit includes means normally holding the parts thereof immovably engaged during simultaneous and equal movement of the traction members, and movable relatively when one of the traction members moves under traction at a different speed than the other traction member.

4. In drive mechanism, in combination, a drive member, a driven shaft, first and second traction members, operating mechanism for said shaft comprising planetary drive gearing including a sun gear and an internal gear, means drivingly connecting the internal gear to one of the traction members for positive driving thereof, means connecting the sun gear to said driven shaft and for positive driving thereof, a friction unit comprising friction loaded engaged parts, one connected to the sun gear, the other to the internal gear, for transmitting supplementary driving forces between the sun gear and the internal gear, means connecting one traction member to the driven shaft, means connecting the other traction member to the internal gear, and means connecting the drive member to the differential shaft.

5. In drive mechanism, in combination, a drive member, a driven shaft, first and second traction members, operating mechanism for said shaft comprising planetary drive gearing including a sun gear and an internal gear, means drivingly connecting the internal gear to one of the traction members for positive driving thereof, means connecting the sun gear to said driven shaft and for positive driving thereof, and a friction unit comprising friction loaded engaged parts, one connected to the sun gear, the other to the internal gear, for transmitting supplementary driving forces from the sun gear to the internal gear in one direction, and from the internal gear to the driven shaft in an opposite direction, respectively.

RAYMOND A. BECKWITH.

REFERENCES CITED

The following references are of record in the file of this patent:

UNITED STATES PATENTS

| Number | Name | Date |
|---|---|---|
| 2,080,477 | Higgins | May 18, 1937 |
| 1,104,005 | Romeiser | July 21, 1914 |
| 1,361,895 | Nogrady | Dec. 14, 1920 |
| 1,481,889 | Carhart | Jan. 29, 1924 |
| 1,750,981 | Wildhaber | Mar. 18, 1930 |
| 1,779,629 | Josephs | Oct. 28, 1930 |
| 1,883,725 | Guilmette | Oct. 18, 1932 |
| 1,979,414 | Smith | Nov. 6, 1934 |